United States Patent
Stetson et al.

[11] 3,744,911
[45] July 10, 1973

[54] HOLOGRAPHIC METHOD FOR INTERFEROMETRIC MEASUREMENT OF MATERIAL CORROSION AND EROSION ON ARBITRARY SURFACES

[75] Inventors: Karl A. Stetson, Richmond, England; Ralph M. Grant, Ann Arbor, Mich.

[73] Assignee: G C Optronics, Inc., Ann Arbor, Mich.

[22] Filed: June 11, 1970

[21] Appl. No.: 45,303

[52] U.S. Cl. ............................................. 356/109
[51] Int. Cl. ............................................. G01b 9/02
[58] Field of Search ........................... 356/106, 113; 73/71.5

[56] References Cited
UNITED STATES PATENTS
3,612,693 10/1971 Stetson .............................. 356/109
3,509,761 5/1970 Stetson .............................. 356/113 X

OTHER PUBLICATIONS
Ennos, A. "Holography and Its Applications". Contemporary Physics, 1967, Vol. 8, No. 2, pp. 153–170.

*Primary Examiner*—Ronald L. Wibert
*Assistant Examiner*—Conrad Clark
*Attorney*—Barnard, McGlynn & Reising

[57] ABSTRACT

To measure the material removal or build up resulting from corrosion or erosion of an object, a hologram is formed by recording on a photographic media the interference pattern between coherent light divided between a uniform, reproducible wavefront, and mutually coherent light reflected from the object. The virtual image of the object as seen through the hologram formed by the developed photographic material, properly illuminated, is superimposed on the object and the object is inclined or rotated or both with respect to its original position, resulting in fringes which may be observed on the superimposed images of the object and the virtual image field. Corrosion or erosion of a section of the surface of the object can increase or decrease its average profile without altering the details of its structure so much as to destroy the visibility of the interference fringes. The result is that the fringes are shifted laterally by an amount that measures the change in average profile due to the corrosion or erosion.

7 Claims, 6 Drawing Figures

Patented July 10, 1973  3,744,911

INVENTORS
Karl A. Stetson &
Ralph M. Grant
BY
Barnard, McGlynn & Reising
ATTORNEYS Patented July 10, 1973  3,744,911

INVENTORS
Karl A. Stetson &
BY Ralph M. Grant

Barnard, McGlynn & Reising
ATTORNEYS

HOLOGRAPHIC METHOD FOR INTERFEROMETRIC MEASUREMENT OF MATERIAL CORROSION AND EROSION ON ARBITRARY SURFACES

BACKGROUND OF THE INVENTION

1. Field of the Invention

This invention relates to a method for measuring the material removal or buildup resulting from corrosion or erosion of an object employing techniques of holographic interferometry as a tool of analysis.

2. Description of the Prior Art

Methods and apparatus for forming holograms have undergone intensive development and improvement in the past few years. These holograms consist of photographic records of the interference pattern between light (generally coherent light as produced by a laser) arriving at a photographic media directly from a source and mutually coherent light which is reflected from an object illuminated by the same source. Upon development of the photographic media and proper illumination of the resulting hologram, an optical reconstruction of the original object, having optical properties identical to those of the object, may be viewed through the hologram plate. Methods have also been developed for detecting minute dimensional changes in an object, or anomalies in its dimensional change pattern, by forming a hologram of an object in an initial state and then viewing the object through the developed hologram under illumination arrangements substantially identical to those used during the formation of the hologram, so that the optical reconstruction of the object is superimposed on the object itself. If the object is displaced from its initial state, as for example by movement, or if its dimensions are changed, interference between light reflected from the object and light reaching the eye from the source through the hologram results in apparent fringe patterns on the image with the fringe array being a function of the dimensional change of the object. This "real-time" hologram interference technique is useful for a number of purposes, such as determining the dynamic states of a vibrating object, the detection of flaws, and the measurement of thermal expansion.

Whereas conventional interferometry has been used for the measurement of material removal (e.g. lens grinding) and material build up (e.g. vacuum depositing of thin films) for a long time, it has the distinct disadvantage of requiring a certain quality with respect to the finish and regularity of the surface to be inspected. Holographic interferometry permits interferometric measurement of displacements of object surfaces which are of arbitrary surface finish and contour; however, no attempt has been made to use holographic interferometry to measure the removal or buildup of material on arbitrary surfaces resulting from corrosion or erosion. One of the major difficulties in the use of holographic interferometry to measure corrosion and erosion is that such processes tend to alter the detailed structure of a surface much more than does a comparable amount of strain. Changes in the detailed structure of a surface will tend to reduce the visibility of hologram interference fringes, often preventing their observation entirely. The success of the application depends, therefore, upon methods which make the observation of hologram interference fringes least sensitive to the detailed structure of the surface.

SUMMARY OF THE INVENTION

The present invention broadly contemplates the measurement of profile changes on the surface of an object which has been subjected to corrosion or erosion. In employing the method of the present invention to study the material removal or buildup resulting from corrosive or erosive reactions with an object, a distinction must be maintained between reactions that tend toward forming pits and cavities in the object and reactions that uniformly remove a surface layer of the object. In the latter group are such reactions as sodium hydroxide on aluminum and acid on steel. These reactions proceed uniformly and usually at a relatively fast pace. They tend to leave the specific surface relief of the material unaffected and holographic comparison with the original surface can measure the average change of the surface profile due to the corrosive effect of the chemical reaction.

In the first group of chemical reactions, there are reactions such as the oxidation of steel, the corrosion of stainless steel and the reaction of salt water on aluminum. These reactions tend to form pits and cavities where the corrosion will proceed very rapidly as opposed to the rest of the surface, which will be practically unaffected. The pits start as very small spots and grow in size and depth. By the time the pits are clearly visible to the eye, the depth of the pits is so great that interferometric measurement cannot be made. One embodiment of the present method provides a means for detecting the pit formation of such reactions long before they can be detected under microscopic examination, and another embodiment provides a means for measuring their rate of growth.

The following description discloses three embodiments of the preferred present invention. In the first method a hologram is taken of an object by simultaneously exposing a photographic plate to a reference beam from a source of coherent light and to an object beam consisting of mutually coherent light reflected from the object. The photographic plate is then developed so as to form the hologram either in situs or by removal, processing, and repositioning in the recording position. The object is then shifted from its original position such as by slightly rotating or inclining the object. By proper illumination of the hologram, the virtual image of the object as seen through the hologram is superimposed upon the object wherein straight fringes are arrayed in a pattern which is a function of the amount of displacement of the object with respect to its original position. Drops of a chemical solution are then placed on the surface and after a predetermined time period are removed producing a fringe shift in the affected area. The departure of the fringes in this area from the straight fringes formed on the unaffected regions can be measured and related to the depth of the material removed or built up due to the corrosive reaction of the solution with the object.

It is important to this embodiment to illuminate the object surface in such a way that all points on the object surface may be observed at the specular reflecting angle when looking or making a photograph through the hologram. Such observation makes the hologram interference fringes least sensitive to changes in the fine structure of the surface, even when the observation and illumination directions are near the surface normal. A convenient method for achieving such illumination is to illuminate the surface with a spherically converging beam of light. If the object surface is temporarily replaced by a mirror, it is quite simple to adjust the angular positions of the hologram recording apparatus so that the reflection of the illumination beam comes to a focus a convenient distance behind the center of the hologram. This point can be marked by a sighting aperture through which the observer looks or through which photographs are taken, when making measurement on the real object surface. A second important modification, helpful but not absolutely necessary to this embodiment, is to mount the object in such a way that it may be removed and replaced without losing the quality of the real-time hologram interference fringes. This modification of the standard hologram making apparatus allows the corrosion or erosion of the sample to be carried out in an environment other than that of the hologram table. This is important when the corrosion involves harmful chemicals or when environmental corrosion is to be studied.

In a second embodiment, a hologram of the object is formed by simultaneously exposing a photographic plate to a reference beam from a source of coherent light and to an object beam consisting of mutually coherent light reflected from a surface of the object, and then developing the photographic media either in situs or by removal, processing, and relocating it in its original position so as to form a hologram of the object surface. Shifting the object to a second position which is inclined with respect to its original position and properly illuminating both it and the repositioned hologram, whose virtual image is superimposed on the original position of the object will result in fringes arrayed in a pattern which is a function of the amount of the shift of the object in the same manner as in the first described method. The object is subjected to a reaction which will result in pit corrosion of the object. Moving the virtual image of the surface as seen through the hologram with respect to the second image of the surface will result in the fringe lines being moved across the object surface. Any region of the object surface will appear to become lighter and darker as a result of the movement, however, the pitted areas will tend to fluctuate in a manner which is out of phase to that of the unaffected surface area of the object, that is, the pitted areas will tend to grow lighter when the unaffected surface areas of the object grow darker and vice-versa.

In a third embodiment of this invention, the object surface is placed in optical contact (e.g. using immersion oil) with the back surface of a hologram plate. It is then illuminated through the photographic layer with a single beam of coherent light and the interference between the incident light and the mutually coherent reflection from the object surface is recorded in the photographic media. The media is then developed, either in position or between removal and replacement, to create a hologram of the Lippmann variety. When the object and hologram are in optical contact and illuminated as during the recording phase, interference fringes may be observed between the virtual image reconstructed by the Lippman hologram and the real object. If the initial (and reconstructing) illumination was sufficiently oblique, the object may easily be observed through a microscope. Careful adjustment of the position of the object will allow observation of the fringes on the surface of the object, even under magnification. The object may then be removed, subjected to pit-forming corrosion, and repositioned on the back of the hologram. The microscopic examination of the fringes will reveal not only the presence of pits but also permit measurement of their depth in a manner analogous to the first embodiment.

It is, therefore, a primary object of the present invention to provide a method of measuring the degree of material buildup and/or material removal of an object resulting from corrosion or erosion by means of holographic interferometry.

DESCRIPTION OF THE DRAWINGS

Other objects, advantages, and applications of the present invention will be made apparent by the following detailed description of the several preferred embodiments thereof. The description makes reference to the accompanying drawings in which like reference characters refer to like parts throughout the several views and in which.

Figure 1:
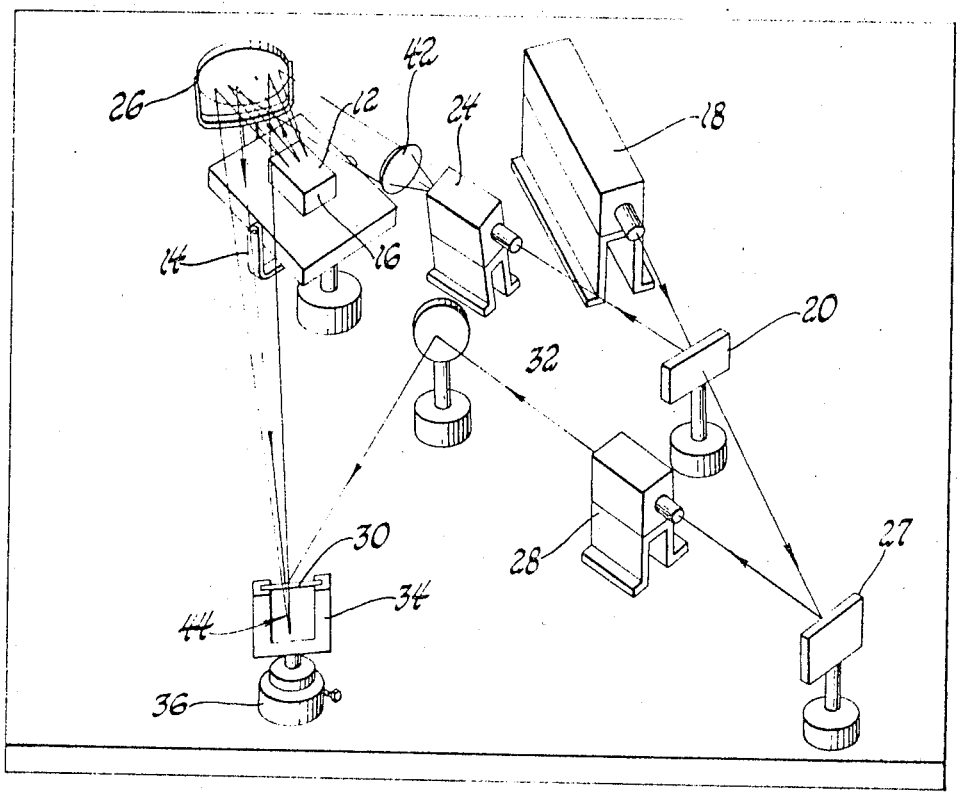
FIG. 1 is a perspective view of an apparatus for practicing the preferred methods of the present invention.
Figure 2:
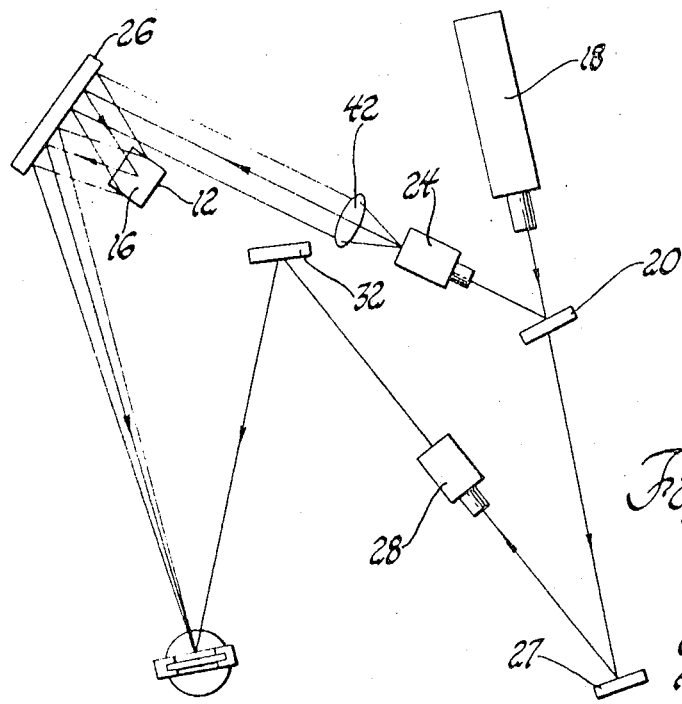
FIG. 2 is a schematic view illustrating the geometric relationships of the apparatus for practicing the present invention in accordance with the apparatus of FIG. 1.

The apparatus for practicing any of the embodiments of the present invention, such as real-time analysis or double-exposure analysis may take substantially the same form. A representative arrangement for determining the degree to which material is removed or built up on a surface of an object as a result of corrosion or erosion by any of these techniques of holographic interferometry is illustrated in FIGS. 1 and 2. In the arrangement of FIGS. 1 and 2, the holographic apparatus is supported on a granite table 10, which may be provided with an air cushion support (not shown) to give it a high degree of stability. The object 12 to be examined is affixed by any suitable means to a stand 14. (The method of affixing may allow for removal and replacement.) The stand 14 is of such a design as to enable a planar surface 16 of the object to be inclined with respect to the horizontal plane. Coherent light for the practice of the holographic method is derived from a laser 18, which may be of the continuous wave type. Its light output is projected to a beam splitter 20. The reflection from the splitter 20 passes through a spatial assembly 24 which comprises a pinhole and a lens which, in turn, projects the beam through lens 42 onto the mirror 26 above the object 12. The mirror 26 projects an area of coherent light onto the planar surface 16 of the object 12.

The other beam passing through the beam splitter 20 is reflected by means of a mirror 27 so as to pass through a second spatial filter assembly 28 and is then reflected to a photographic plate 30 from a mirror 32. The photographic plate 30 also receives reflected light from the planar surface 16 by means of the mirror 26 which is in adjustment with lens 42 and the planar surface 16 so that the specular reflection converges to a point 44 behind the hologram plate 30.

The beam of light projected onto the photographic plate 30 by means of the mirror 32 will be referred to hereinafter as the reference beam, while the light reflected to the photographic plate 30 by the illuminated planar surface 16 will be termed the object beam. It should be noted that the path of the reference beam and object beam should be substantially the same.

The two light fields interfere with one another causing an optical pattern to be recorded on the photographic plate 30. The photographic plate 30 is disposed in a plate holder 34 which is in turn supported on a base generally indicated at 36. The base 36 is adapted to permit adjustment of the position of the photographic plate with respect to the other apparatus. This is done by rotating the plate holder or adjusting it along either of a pair of mutually perpendicular lines in a horizontal plane. The plate holder 34 in which the photographic plate is disposed may be of any suitable variety and may be designed to permit processing the plate in situs.

In the practice of any holographic interferometry techniques, the photographic plate 30 is first placed in the plate holder 34, the laser is turned on and an exposure is made. In the real-time or double-exposure methods, this initial exposure is of a length that is dependent upon the speed of the photographic emulsion and the illumination level and is sufficient to provide adequate recordation of the interference pattern between the reference and object beams without significant object motion.

Following the initial exposure in a real-time analysis, the plate is suitably developed either in situs, if the plate holder is so equipped, or by moving it for processing and later inserting the developed hologram in the plate holder. The laser may then be reinitiated and the virtual image recorded by the initial exposure and may be seen by viewing through the hologram in the direction of the object. It may be necessary to adjust the relative intensities of the reference and object beam with respect to their intensity during the exposure process.

Figure 3:
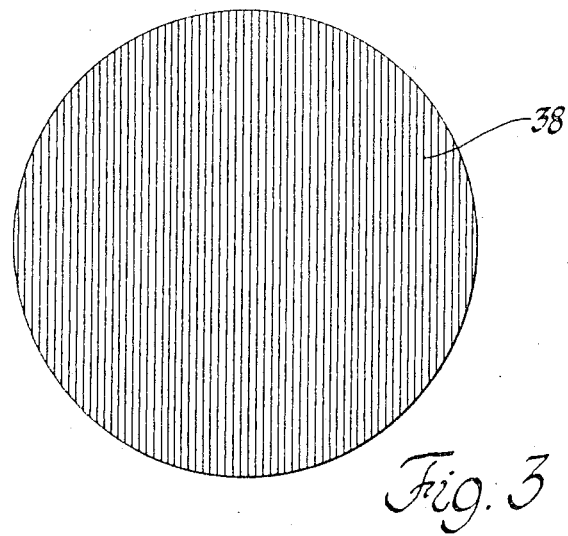
FIG. 3 is a view of an inclined object with the virtual image (as seen through the hologram) superimposed thereon, in which there is created a fine fringe pattern over the object surface.

The mounting stand 14 is then adjusted so as to incline the planar surface 16 slightly with respect to its original position which was parallel to the horizontal plane. When viewing the object through the hologram after the object has been inclined, the viewer will see a fine fringe pattern over the object surface which consists of a plurality of parallel straight fringes 38 and is illustrated in FIG. 3 of the drawings.

Figure 4:
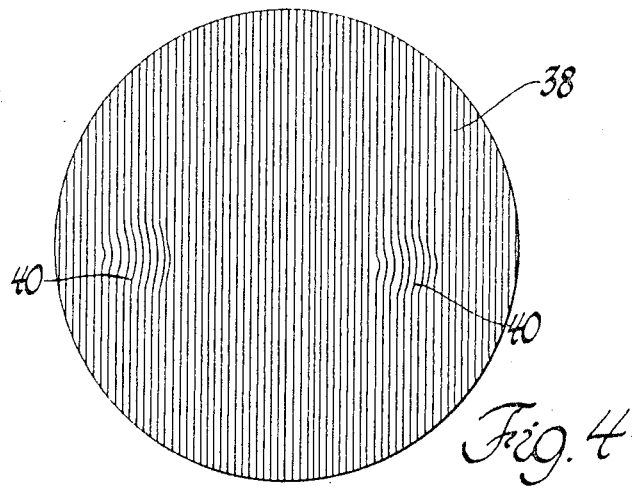
FIG. 4 is a view of an object as viewed through a hologram in which the virtual image is superimposed over the object and the object has been subjected to corrosive or erosive reaction resulting in a fringe shift in those areas so subjected.

Several drops of an etching solution are then placed on the planar surface 16 and after a predetermined period has elapsed the solution is removed from the surface. After the time period has expired and the solution has been removed, a certain amount of corrosion will have taken place on the planar surface 16 in which a portion of the material of the object will have been removed by the solution. Alternately, the object 12 may be removed and subjected to similar corrosion, then replaced on the object stand 14 if it is so equipped as to permit this. Upon viewing of the object through the hologram at the point 44 a fringe shift will be observed. This fringe shift is indicated by the numeral 40 in FIG. 4.

The depth of the material removed from the planar surface by means of the etching solution can be determined from the fringe shift as such a shift is a function of the average profile change which occurred in the planar surface as a result of the corrosion effect of the etching solution.

In the double exposure technique, the photographic plate is not developed or removed from the plate holder 34 after the initial exposure but rather, a second exposure is made after the etching solution has been removed from the planar surface. After the second exposure, the photographic plate is removed and developed. The resultant hologram is utilized by illuminating one side with coherent light at approximately the same angle which the reference beam impinged during the exposure process, and viewing through the other side of the hologram at a point corresponding to point 44. A reconstructed image of the object will be seen in which there is created a fine fringe pattern over the whole object and in those areas which have been exposed to the solution, the fringe lines will have shifted and this departure from the straight fringes can be measured and related to the depth of the etch in the same manner as that for the real-time technique.

If the object 12 utilized in the above techniques was of aluminum and after the first hologram is made of the object as described above in the real-time technique, the object is taken and soaked in sea water for a few hours, small areas of pit corrosion will be formed thereon. In the initial stages of such pit formation, the outward appearance of a fringe shift on the sample, after it has been replaced on the stand, will not be apparent to the naked eye. Nor will the pit formation be observable under microscopic inspection as the pitting in its initial state will not differ much from the rest of the planar surface 16. In order to be able to detect the location of the pit corrosion, the object and the photographic plate are moved relative to each other. This may be accomplished by moving the photographic plate back and forth by any suitable means such as manually so that the fringe lines which appear on the surface of the planar face can be moved across the surface of the object as seen when viewing the object through the hologram. That portion of the surface which has not been subjected to the corrosive effect of the water, that is, no pitting has formed thereon, will grow lighter and darker with the motion of the fringes being moved back and forth thereacross; however, the pitted areas due to the action of the sea water on the surface of the object will tend to fluctuate in a way that is out of phase, that is, growing lighter when the unaffected portion of the surface grows darker and growing darker when the unaffected portion of the surface grows lighter. In a dynamic observation of this type, the pitted areas are quite easily detected; however, they provide little opportunity for a static photograph.

Figures 5, 6:
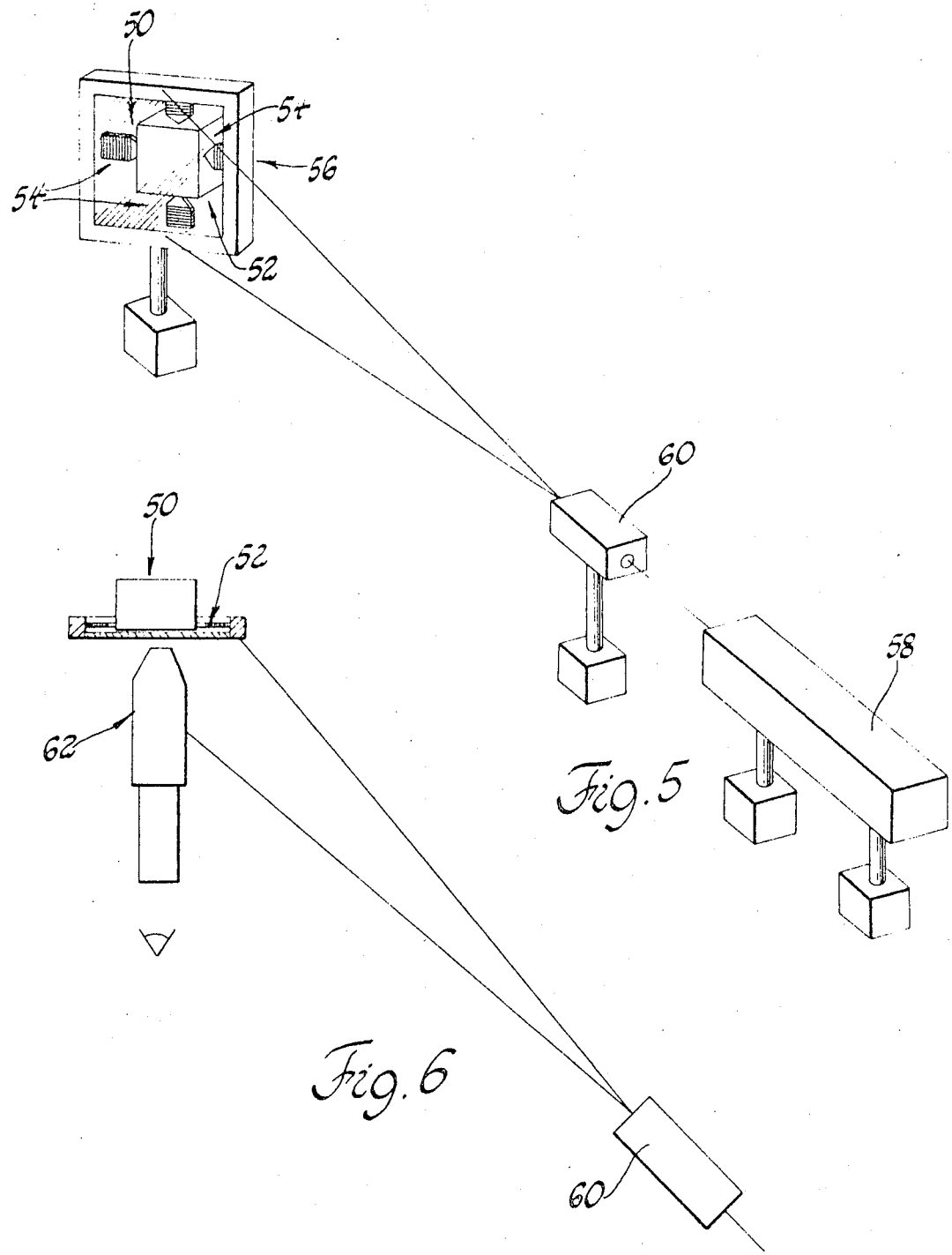
FIG. 5 is a perspective view of an apparatus for practicing the preferred methods of the third embodiment of this invention, during the hologram recording phase.
FIG. 6 is a top view of the same apparatus as in FIG. 5 during the reconstruction and interferometric inspection phase.

A representative arrangement for measuring the rate and contour formation of pit corrosion by the techniques of holographic interferometry is illustrated in FIGS. 5 and 6. In the arrangement of FIGS. 5 and 6 the holographic arrangement is supported on a granite table and air cushion support (not shown) to give it a high degree of stability. The object 50 to be examined is affixed in optical contact, through the use of a layer of index of refraction matching liquid, to the back of the unexposed hologram plate 52. The object 50 is held by the positioning screws 52 which allow it to be moved with a high degree of accuracy. The hologram plate 52 is held in the plate holder 56. A beam of light from a laser 58 is made to diverge by the lens and pinhole combination which comprise the spatial filter assembly 60. The plate holder 56 is positioned so that the light strikes it obliquely. The light incident upon the plate and the light reflected by the object interfere in the region of the photographic media on the front surface of the hologram plate and expose a pattern into the photographic media which can be subsequently developed into a hologram. The hologram recording may take a form analogous to a Lippmann photograph of the media many times thicker than the wavelength of light, or it may take the form of a reflection grating if the material thickness is in the order of the wavelength of light. With either type of physical structure it is possible to replace the object 50 in optical contact with the back of the developed hologram plate 52, and illuminate it as before with the same diverging laser beam. If the object 50 is positioned accurately into the same location on the back of the hologram plate 52 it occupied during the recording phase, interference fringes may be observed in real time between the reconstructed field from the hologram and the field reflected by the object from the undiffracted light transmitted through the hologram. If the hologram is comprised of a material such as a photographic emulsion which has been developed into silver grains, it will attenuate the light transmitted without diffraction and this attenuation can be controlled so as to equalize the intensity of the image of the hologram reconstruction and the image of the real object. Under this condition the interference fringes observed will have high visibility. Also, if the hologram is comprised of a photographic emulsion, shrinkage may occur between exposure and reconstruction due to conventional photographic processing techniques. Such shrinkage must, and can, be compensated by special hologram processing techniques, such as soaking with a six percent triethanolamine solution to permit reconstruction of the hologram at the same angle as recording.

If the illumination of the hologram for recording and reconstruction is sufficiently oblique, the reconstruction and the object may be viewed through a microscope 62 whose objective lens is designed to permit a long working distance. If interference fringes have been obtained, careful positioning of the object can permit observation of these fringes on the surface of the object. If the fringes have not been obtained, or if they are not observed on the surface of the object, the observation of the two images of the object surface through the microscope will serve as a guide for aligning the object with its reconstruction. If no lateral displacement can be observed between the object and its reconstructed image, the fringes will be observed on the surface of the object. Fringe densities up to and exceeding five fringes per millimeter can be observed with good visibility with such arrangements and permit measurement of fringe shifts in areas of the object surface as small as 1 millimeter in diameter.

The object 50 may be removed from such an apparatus and subjected to pit forming corrosion. If the object 50 is, for example, metallic iron and it is subjected to oxidation either by water or by hydrogen perioxide, small pits will start to form on the surface of the object example. If the object 50 is repositioned in optical contact on the back of the hologram 52, and an adjustment is carried out so that fringes are observed on the surface of the object 50, examination of the fringe by means of the microscope 62 will reveal small displacements of the fringes in the regions of the pits. The displacements of the fringes can be used to measure the depth of the pit in the same fashion as discussed for larger sample areas in FIGS. 3 and 4.

The embodiments of the invention in which an exclusive property or privilege is claimed are defined as follows:

1. The method of measuring the difference between the surface profile of a section of the surface of a member with respect to the balance of the surface comprising: simultaneously exposing a photographic media to a reference beam of coherent light and to light reflected from said surface; developing the photographic media so as to form a hologram of said surface; superimposing the virtual image of said surface, as seen through the resultant hologram when the hologram is properly illuminated, with a second image of said surface; shifting said virtual image relative to said second image of said surface to produce a visible fringe pattern on said images; modifying the surface profile at said section and measuring the deviation of the fringes at said section relative to the fringes on the balance of the surface.

2. The method of claim 1 wherein the second image of said surface is created in real time by said surface.

3. The method of claim 1 wherein the second image is shifted by shifting said surface to a position which is inclined with respect to said surface's original position.

4. The method of claim 1 wherein said second image of said surface occurs as a result of a second exposure of the photographic media simultaneously to a reference beam of coherent light and to an object beam consisting of mutually coherent light reflected from said surface, at a time later than the initial exposure of the photographic media, after the surface section is subjected to corrosion or erosion and before the developing of the photographic media, so that two holograms are recorded in the same photographic media.

5. The method of detecting the profile change of a section of the surface of a member with respect to the balance of the surface when said surface section is exposed to corrosion or erosion, comprising: simultaneously exposing a photographic media to a reference beam of coherent light and to an object beam consisting of mutually coherent light reflected from said surface, developing the photographic media so as to form a hologram of said surface; superimposing the virtual image of said surface, as seen through the resultant hologram when the hologram is properly illuminated with a second image of said surface, shifting said virtual image and said second image of said surface relative to one to form fringe lines arrayed in a pattern which is a function of the amount of the relative shift of said images; subjecting a section of said surface to corrosion or erosion which results in a deformation of said section; and moving the virtual image of said surface relative to said second image whereby that portion of the surface of said second image which was not subject to said corrosion or erosion will grow lighter and darker with the movement of the fringe lines thereacross while said surface deformations will tend to fluctuate out of phase growing lighter when the unsubjected surface grows darker and vice versa.

6. The method of claim 5 wherein the second image of said surface is created in real time by said surface.

7. The method of claim 5 wherein the second image is shifted by shifting said surface to a position which is inclined with respect to said surface's original position.

* * * * *